United States Patent
Liu et al.

(10) Patent No.: US 12,192,999 B2
(45) Date of Patent: *Jan. 7, 2025

(54) INFORMATION TRANSMISSION METHOD AND COMMUNICATIONS DEVICE

(71) Applicant: VIVO MOBILE COMMUNICATION CO., LTD., Guangdong (CN)

(72) Inventors: Siqi Liu, Chang'an Dongguan (CN); Zichao Ji, Chang'an Dongguan (CN); Kai Wu, Chang'an Dongguan (CN); Yu Ding, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 680 days.

This patent is subject to a terminal disclaimer.

(21) Appl. No.: 17/244,715

(22) Filed: Apr. 29, 2021

(65) Prior Publication Data

US 2021/0250936 A1    Aug. 12, 2021

Related U.S. Application Data

(63) Continuation of application No. PCT/CN2019/112677, filed on Oct. 23, 2019.

(30) Foreign Application Priority Data

Nov. 2, 2018 (CN) .......................... 201811302729.9

(51) Int. Cl.
*H04W 72/20* (2023.01)
*H04L 5/00* (2006.01)
(52) U.S. Cl.
CPC ........... *H04W 72/20* (2023.01); *H04L 5/0048* (2013.01)

(58) Field of Classification Search
CPC ............................. H04W 72/20; H04L 5/0048
USPC ................ 370/329, 328, 338, 341, 345, 350
See application file for complete search history.

(56) References Cited

U.S. PATENT DOCUMENTS

| | | |
|---|---|---|
| 2013/0272263 A1 * | 10/2013 | Pi ........................ H04L 25/0204 370/330 |
| 2013/0279437 A1 | 10/2013 | Ng et al. |
| 2015/0282126 A1 | 10/2015 | Park et al. |
| 2018/0287681 A1 | 10/2018 | Chen et al. |
| 2018/0288755 A1 | 10/2018 | Liu et al. |

(Continued)

FOREIGN PATENT DOCUMENTS

| CN | 103945447 A | 7/2014 |
|---|---|---|
| CN | 107302796 A | 10/2017 |

(Continued)

OTHER PUBLICATIONS

Russian Office Action issued in corresponding application No. 2021115243/07, dated Mar. 17, 2022.

(Continued)

*Primary Examiner* — Nghi H Ly
(74) *Attorney, Agent, or Firm* — BROOKS KUSHMAN P.C.

(57) ABSTRACT

This disclosure discloses an information transmission method and a communications device. The method includes: obtaining a reference object group containing at least two reference objects, where the reference objects contained in the reference object group are quasi co-located; and performing information transmission based on the reference object group.

20 Claims, 4 Drawing Sheets

(56) References Cited

U.S. PATENT DOCUMENTS

| | | |
|---|---|---|
| 2019/0036589 A1 | 1/2019 | Ren et al. |
| 2019/0058517 A1* | 2/2019 | Kang .................. H04B 7/0626 |
| 2019/0230646 A1 | 7/2019 | Li et al. |
| 2019/0260425 A1 | 8/2019 | Ji et al. |
| 2019/0260545 A1 | 8/2019 | Wang et al. |
| 2019/0356364 A1* | 11/2019 | Maamari ............... H04L 5/0062 |
| 2019/0356448 A1 | 11/2019 | Li et al. |
| 2019/0379431 A1 | 12/2019 | Park et al. |
| 2020/0059913 A1 | 2/2020 | Tang |
| 2020/0252192 A1 | 8/2020 | Gao et al. |
| 2020/0275514 A1 | 8/2020 | Takahashi et al. |
| 2021/0250991 A1* | 8/2021 | Liu ..................... H04W 72/046 |

FOREIGN PATENT DOCUMENTS

| | | |
|---|---|---|
| CN | 107888266 A | 4/2018 |
| CN | 108024274 A | 5/2018 |
| CN | 108024375 A | 5/2018 |
| CN | 108111276 A | 6/2018 |
| CN | 108282285 A | 7/2018 |
| CN | 108633029 A | 10/2018 |
| JP | 2015533062 A | 11/2015 |
| RU | 2617833 C2 | 4/2017 |
| WO | 2016033978 A1 | 3/2016 |
| WO | 2018/017163 A1 | 1/2018 |
| WO | 2018128410 A1 | 7/2018 |
| WO | 2018137397 A1 | 8/2018 |
| WO | 2018174271 A1 | 9/2018 |
| WO | 2018174803 A1 | 9/2018 |
| WO | 2018190678 A1 | 10/2018 |
| WO | 2018195777 A1 | 11/2018 |
| WO | 2020056591 A1 | 3/2020 |

OTHER PUBLICATIONS

Indian Office Action issued in corresponding application No. 202127024519, dated Mar. 1, 2022.
JP Office Action in Application No. 2021-523399 Dated May 30, 2022.
KR Office Action in Application No. 10-2021-7014646 Dated Jun. 28, 2022.
"Feature lead summary on QCL" 3GPP TSG RAN WG1#93, Nokia, Nokia Shanghai Bell, R1-1807664, May 21, 2018.
CN Office Action in Application No. 201811302729.9 dated Jun. 25, 2021.
"Beam Indication, Measurements and Reporting" 3GPP TSG RAN WG1 Meeting #90bis, Nokia, Nokia Shanghai Bell, R1-1718511, Oct. 9, 2017.
Written Opinion and International Search Report in Application No. PCT/CN2019/112677 dated May 14, 2021.

* cited by examiner

INFORMATION TRANSMISSION METHOD AND COMMUNICATIONS DEVICE

CROSS-REFERENCE TO RELATED APPLICATIONS

This application is a continuation application of PCT Application No. PCT/CN2019/112677 filed on Oct. 23, 2019, which claims priority to Chinese Patent Application No. 201811302729.9, filed in China on Nov. 2, 2018, which is incorporated herein by reference in its entirety.

TECHNICAL FIELD

This disclosure relates to the field of communications technologies, and in particular, to an information transmission method and a communications device.

BACKGROUND

In mobile communications systems, transmission channels or transmission resources are associated with certain downlink signals such as the channel state information reference signal (CSI-RS) and synchronization signal/physical broadcast channel block (SS/PBCH block, or referred to as SSB). A terminal can select corresponding resources for information transmission according to measurement results on these downlink signals or instructions from a network device.

In some cases, for example, in an unlicensed band transmission mechanism, available (available) resources for a network device and a terminal are uncertain. Even if the network device has configured resources for certain downlink signal for the terminal, the terminal still cannot determine whether the network device has preempted corresponding resources and successfully transmitted a downlink signal. As shown in FIG. 1, in T1, a network device has preempted only two SSB resources and transmitted SSB1 and SSB2; in T2, the network device fails to preempt any resource in; and in T3, the network device has preempted four SSB resources and transmitted SSB1, SSB2, SSB3, and SSB4, where SSB1 and SSB3 are in quasi co-location (QCL), and SSB2 and SSB4 are in QCL. The network device indicates that a total of SSB1, SSB2, SSB3, and SSB4 are transmitted, and establishes an association relationship between SSBs and transmission resources based on these four SSBs. Assuming that the terminal receives SSB1 at T1 and finishes the reception of SSB1 and attempts to transmit information before T3, the terminal cannot detect SSB3 and can only select a transmission resource based on SSB1. If this transmission resource is unavailable, the information transmission may fail because no other resources are available. In sidelink, a user may need to monitor resources to determine which resources are available. Therefore, available resources are also uncertain, and similar problems may also occur.

SUMMARY

Embodiments of this disclosure provide an information transmission method and a communications device to resolve a problem of information transmission failure caused when terminal can transmit information only based on a detected reference object but cannot select another available transmission resource for information transmission.

According to a first aspect, an embodiment of this disclosure provides an information transmission method, applied to a receive end and including:
  obtaining a reference object group containing at least two reference objects, where the reference objects contained in the reference object group are quasi co-located; and
  performing information transmission based on the reference object group.

According to a second aspect, an embodiment of this disclosure further provides a communications device, applied to a receive end and including:
  a first obtaining module, configured to obtain a reference object group containing at least two reference objects, where the reference objects contained in the reference object group are quasi co-located; and
  a first transmission module, configured to perform information transmission based on the reference object group.

According to a third aspect, an embodiment of this disclosure provides an information transmission method, applied to a transmit end and including:
  transmitting, to a receive end, parameter information of a reference object group containing at least two reference objects, where the reference objects contained in the reference object group are quasi co-located, and the parameter information includes at least one of spatial information, pattern information, and index information of the reference object group.

According to a fourth aspect, an embodiment of this disclosure provides a communications device, applied to a transmit end and including:
  a first transmitting module, configured to transmit, to a receive end, parameter information of a reference object group containing at least two reference objects, where the reference objects contained in the reference object group are quasi co-located, and the parameter information includes at least one of spatial information, pattern information, and index information of the reference object group.

According to a fifth aspect, an embodiment of this disclosure further provides a communications device, where the communications device includes a processor, a memory, and a computer program stored in the memory and running on the processor; and when the processor executes the computer program, the steps of the foregoing information transmission methods are implemented.

According to a sixth aspect, an embodiment of this disclosure provides a computer-readable storage medium, where the computer-readable storage medium stores a computer program, and when the computer program is executed by a processor, the steps of the foregoing information transmission methods are implemented.

Thus, according to the embodiments of this disclosure, available transmission resources can be determined based on a reference object group containing at least two reference objects, increasing opportunities for selecting available transmission resources, and improving information transmission efficiency.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

Figure 1:
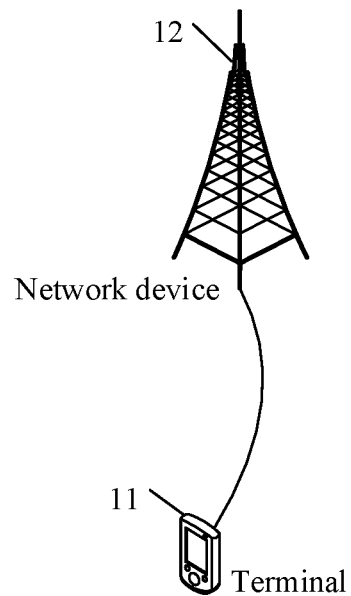
FIG. 1 is a block diagram of a mobile communications system to which an embodiment of this disclosure can be applied.

The following describes example embodiments of this disclosure in more detail with reference to the accompanying drawings. Although the example embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and completely convey the scope of this disclosure to a person skilled in the art.

The terms "first", "second", and the like in this specification and claims of this application are used to distinguish between similar objects instead of describing a specific order or sequence. It should be understood that the data used in this way is interchangeable in appropriate circumstances, so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. "And/or" in the specification and claims represents at least one of the associated objects.

The technologies described herein are not limited to long term evolution (Long Term Evolution, LTE)/LTE-Advanced (LTE-A) systems, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are usually used interchangeably. The technologies described in this specification may be used for the foregoing systems and radio technologies, and may also be used for other systems and radio technologies. However, in the following descriptions, a new radio (NR) system is described for an illustration purpose, and NR terms are used in most of the following descriptions, although these technologies may also be applied to other applications than the NR system application.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

FIG. 1 is a block diagram of a wireless communications system to which an embodiment of this disclosure can be applied. The wireless communications system includes a terminal 11 and a network device 12. The terminal 11 may also be referred to as a terminal device or user equipment (UE). The terminal 11 may be a terminal side device such as a mobile phone, a tablet computer (Tablet Personal Computer), a laptop computer (Laptop Computer), a personal digital assistant (PDA), a mobile internet device MID), a wearable device (Wearable Device), or an in-vehicle device. It should be noted that the specific type of the terminal 11 is not limited in the embodiments of this disclosure. The network device 12 may be a road side unit (RSU), a base station, or a core network, where the base station may be a base station of 5G or a later version (for example, a gNB or a 5G NR NB), or a base station in other communications systems (for example, an eNB, a wireless local area network (WLAN) access point, or another access point). The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a wireless fidelity (Wi-Fi) node, or another appropriate term in the art. As long as the same technical effect is achieved, the base station is not limited to a specific technical term. It should be noted that the base station in the NR system is only taken as an example in the embodiments of this disclosure, but a specific type of the base station is not limited.

The base station may communicate with the terminal 11 under the control of a base station controller. In various examples, the base station controller may be a part of the core network or some base stations. Some base stations may exchange control information or user data with the core network via backhaul. In some examples, some of these base stations may communicate with each other directly or indirectly by using backhaul links. The backhaul links may be wired or wireless communications links. The wireless communications system may support operations on a plurality of carriers (wave signals of different frequencies). A multi-carrier transmitter can transmit modulated signals on the plurality of carriers simultaneously. For example, multi-carrier signals modulated by various radio technologies may be transmitted on each communications link. Each modulated signal may be sent on different carriers and may carry control information (for example, a reference signal or a control channel), overhead information, data, and the like.

The base station may communicate wirelessly with the terminal 11 through one or more access point antennas. Each base station may provide communication coverage for a corresponding coverage area of the base station. A coverage area of an access point may be divided into sectors forming only a part of the coverage area. The wireless communications system may include different types of base stations (for example, a macro base station, a micro base station, and a picocell base station). The base station may also use different radio technologies, such as cellular and WLAN radio access technologies. The base station may be associated with a same or different access networks or operator deployments. Coverage areas of different base stations (including coverage areas of base stations of a same type or different types, coverage areas using a same radio technology or different radio technologies, or coverage areas of a same access network or different access networks) may overlap each other.

Communication links in the wireless communications system may include an uplink for carrying an uplink (UL) transmission (for example, from the terminal 11 to the network device 12), or a downlink for carrying a downlink (DL) transmission (for example, from the network device 12 to the terminal 11). The UL transmission may also be referred to as reverse link transmission, while the DL transmission may also be referred to as forward link transmission. A licensed band, an unlicensed band, or both may be used for downlink transmission. Similarly, a licensed band, an unlicensed band, or both may be used for uplink transmission.

Figure 2:
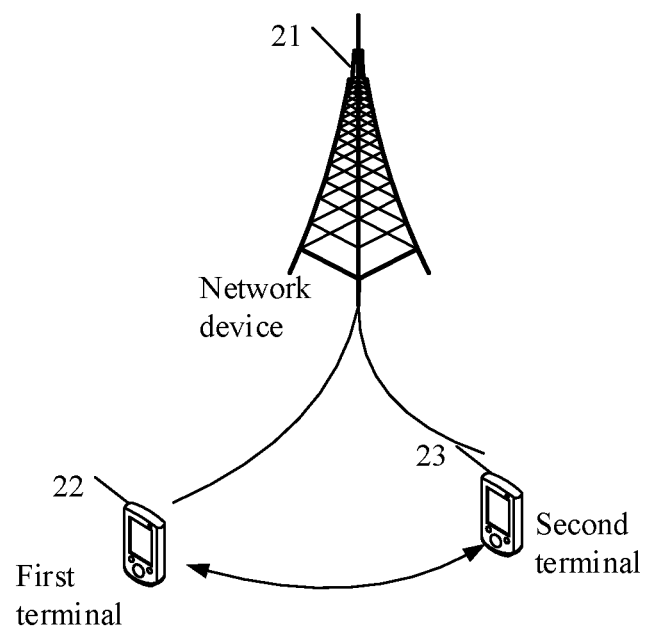
FIG. 2 is a block diagram of another mobile communications system to which an embodiment of this disclosure can be applied.

FIG. 2 is a block diagram of another wireless communications system to which an embodiment of this disclosure can be applied, which is a transmission system such as a sidelink, or referred to as a side link, a side link, or a side link. The wireless communications system includes a network device 21, a first terminal 22, and a second terminal 23. The first terminal 22 and the second terminal 23 may directly perform transmission without through a network device. In this scenario, both a receive end and a transmit end are terminals, that is, an identity of the transmit end in this scenario is different from that shown in FIG. 1.

An embodiment of this disclosure provides an information transmission method applied to a receive end. The information transmission method may be applied to an interaction system between a network device and a terminal, or may be applied to a sidelink transmission system. When the information transmission method is applied to the system shown in FIG. 1, the receive end is a terminal, and the transmit end is a network device. When the information transmission method is applied to the system shown in FIG. 2, both the receive end and the transmit end are terminals.

Figure 3:
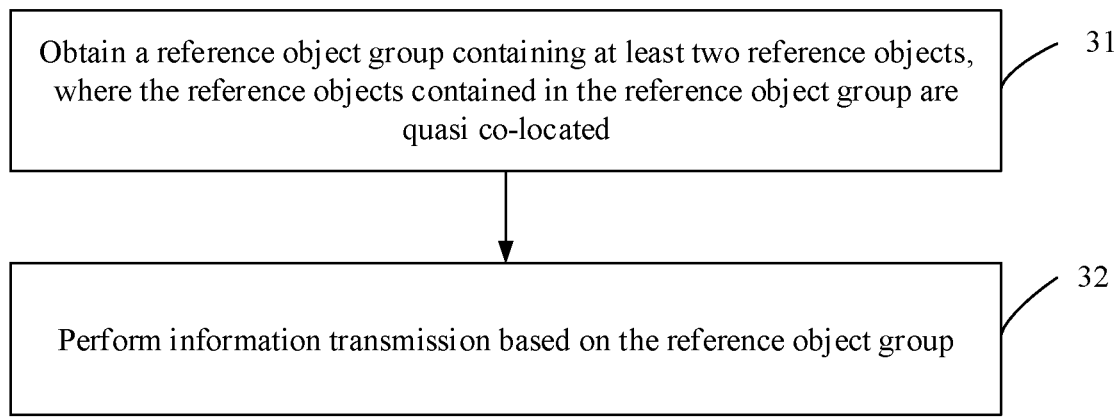
FIG. 3 is a schematic flowchart of an information transmission method for a receive end according to an embodiment of this disclosure.

As shown in FIG. 3, the information transmission method includes the following steps.

Step 31: Obtain a reference object group containing at least two reference objects, where the reference objects contained in the reference object group are quasi co-located.

The reference object group includes a plurality of reference objects, and the plurality of reference objects satisfy a specified quasi co-location relationship. The reference objects contained in the reference object group may include, but are not limited to: SSBs and/or channel state information reference signals (CSI-RS). Reference objects contained in one reference object group may have the same or different signal types. For example, the reference object group includes quasi co-located SSBs, or the reference object group includes quasi co-located CSI-RSs, or the reference object group includes quasi co-located SSBs and CSI-RSs. In addition, reference objects contained in different reference object groups may be in the same or different quantities. When a quasi co-location relationship between different reference object groups is not indicated, the receive end does not assume that the plurality of reference objects belonging to the different reference object groups are quasi co-located.

The reference objects contained in the reference object group satisfying the quasi co-location relationship may also be referred to as satisfying a specific beam relationship (for example, using the same or corresponding beams), or satisfying a specific spatial relationship (for example, transmission directions are the same or overlap), or applying some identical spatial domain transmission filter (spatial domain transmission filter) parameters (for example, applying the same spatial domain transmission filter), or applying the same QCL reference (for example, having the same QCL source, referred to as QCL source), or applying at least one identical QCL parameter or attribute. The QCL parameter or attribute includes at least one of the following: Doppler spread (Doppler spread), Doppler shift (Doppler shift), average gain (average gain), average delay (average delay), delay spread (delay spread), spatial Rx parameters (spatial Rx parameters), and when applicable (and when applicable), or the like. A quasi co-location type satisfied by the reference objects contained in the reference object group may be any one of QCL TypeA, QCL TypeB, QCL TypeC, and QCL TypeD. It should be noted that in this embodiment of this disclosure, that the reference objects are basically SSBs is used as an example for description. When the reference objects are CSI-RSs or other signals, reference may be made to corresponding implementations to achieve expected effect.

Step 32: Perform information transmission based on the reference object group.

The transmission mentioned in this embodiment of this disclosure may be sending or receiving. The method of performing information transmission based on the reference object group mentioned in this embodiment of this disclosure is applicable to different transmission procedures, for example, various types of random access procedures, downlink control information (Downlink Control Information, DCI) monitoring procedures, or other information transmission procedures.

Step 31 may be implemented in different ways. This embodiment only uses the following implementation as an example for description. Other implementations may also be applied to the embodiments of this disclosure.

Implementation 1: Obtain parameter information (or related information) of the reference object group, and determine the reference object group based on the parameter information.

This implementation is an explicit indication method. The parameter information of the reference object group includes at least one of spatial information, pattern information, and index information of the reference object group. In addition, the parameter information may further include configuration information of the reference object group in addition to the above-mentioned information.

The reference object group may be indicated by the spatial information (or referred to as direction information, QCL information, QCL type information, QCL spatial information, or the like). The spatial information may be pre-defined (for example, protocol-defined), indicated by a network device, or pre-configured by a manufacturer.

Using SSBs as an example, it is supposed that the transmit end (a network device or a terminal) transmits SSB group (group) configuration signaling to allocate 64 SSB indexes (SSB index) into 8 SSB index groups, that is, divide into 8 SSB groups. Each group includes up to 8 SSB indexes, and the receive end (terminal) considers that SSB indexes in one group constitute an SSB group and are QCLed. Optionally, the transmit end may alternatively transmit spatial information of each SSB group. For example, the transmit end transmits a direction information list for each SSB group, {direction 2, direction 3, direction 4, direction 5, direction 7, direction 6, direction 8, direction 1}. Each direction identifier in the direction information list represents a different direction, and the direction identifiers in the direction information list are in one-to-one correspondence to the SSB groups. Therefore, the receive end may determine a transmission direction of each SSB group based on the spatial information.

In addition, the reference object group may alternatively be indicated by the pattern (pattern) information and/or the index (index) information, where the pattern information and the index information may also be predefined (for example, protocol-defined), indicated by the transmit end, or pre-configured by a manufacturer, and indication modes of the pattern information and the index information may be the same or different. In some embodiments, the index information of the reference object group may be implicitly carried by some signals, such as physical broadcast channel (PBCH), demodulation reference signal (DMRS), and system information block (SIB), DCI, or other system information (OSI), or explicitly carried by these signals. Optionally, the transmit end may transmit spatial information of each reference object group. For example, the transmit end transmits a direction information list for each reference object group, {direction 2, direction 3}. Each direction identifier in the direction information list represents a different direction, and the direction identifiers in the direction information list are in one-to-one correspondence to the reference object groups. Therefore, the receive end may determine a transmission direction of each reference object group based on the spatial information.

Using an SSB as an example, the receive end obtains a pattern of an SSB group and an index of the SSB group to determine the SSB group. For example, a pattern of the SSB group is protocol-predefined, and in a pattern configuration 1 of the SSB group, SSB1 and SSB2 belong to a same SSB group, and SSB3 and SSB4 belong to another SSB group. In a pattern configuration 2 of the SSB group, SSB1, SSB2, SSB3, and SSB4 belong to a same SSB group. The transmit end indicates that an index of the SSB group is 1, and the receive end determines that SSB1 and SSB2 belong to a same SSB group and are QCLed. SSB3 and SSB4 belong to another SSB group and are QCLed.

Further, the index of the SSB group represents a spatial grouping factor (or referred to as a QCL factor, a grouping factor, a repetition factor, or the like), and indicates a quantity of SSBs included in one SSB group. For example, a value range of the index of the SSB group is {1, 2, 4, 8}. When the index of the SSB group is 4, that is, the spatial grouping factor is 4, it means that there are 4 QCL SSBs in one SSB group. Correspondingly, the receive end may deduce a quantity of SSB groups based on the spatial grouping factor. For example, in some frequency domains, at most L SSBs can be transmitted in one period. If the spatial grouping factor is i, there are L/i groups, and each group has i QCLed SSBs. L/i QCLed SSBs in each group may be L/i SSBs with continuous indexes, or may be SSBs corresponding to indexes discretely distributed based on a predetermined pattern. Alternatively, optionally, there are at most L SSB time domain positions in one period. If the spatial grouping factor is i, there are L/i groups, each group has i QCLed SSB time domain positions, and SSBs transmitted on these time domain positions are QCLed. L/i QCLed SSB time domain positions in each group may be L/i time domain positions with continuous time domain position numbers, or may be time domain positions discretely distributed based on a predetermined pattern.

Optionally, the index of the SSB group indicates a quantity of groups, that is, indicates a quantity of SSB groups. For example, a value range of the index of the SSB group is {1, 2, 4, 8}. When the index of the SSB group is 4, that is, a quantity of SSB groups is 4, correspondingly, the receive end may deduce a quantity of SSBs in the SSB group based on the spatial grouping factor. In some frequency domains, at most L SSBs are transmitted in one period. If a quantity of groups is j, there are j groups, and each group has L/j QCLed SSBs. L/j QCLed SSBs in each group may be L/j SSBs with continuous indexes, or may be SSBs corresponding to indexes discretely distributed based on a predetermined pattern. Alternatively, optionally, there are at most L SSB time domain positions in one period. If the quantity of groups is j, there are j groups, each group has L/j QCLed SSB time domain positions, and SSBs transmitted on these time domain positions are QCLed. L/j QCLed SSB time domain positions in each group may be L/j time domain positions with continuous time domain position numbers, or may be time domain positions discretely distributed based on a predetermined pattern.

Implementation 2: Obtain spatial information of at least two reference objects, and determine the reference object group based on the spatial information.

This implementation is an implicit indication method. The spatial information includes spatial index information and/or a spatial grouping factor, and the reference objects are indicated by reference index information and/or time domain position information. The reference index information and time domain position information of the reference objects may be referred to as reference object indication information. It should be noted that the time domain position information of the reference objects in this embodiment of this disclosure may be candidate time domain positions of the reference objects, or time domain positions of reference objects that are actually used and transmitted.

The step of determining the reference object group based on the spatial information includes the following operations:

1. Determining that reference objects having the same spatial index information belong to a same reference object group. Using an SSB as an example, the spatial information of the SSB is a spatial index (or referred to as a QCL index) set. The SSB is indicated by an SSB index. Spatial indexes in the spatial index set are in one-to-one correspondence to SSB indexes. The receive end considers that SSB indexes corresponding to the same spatial index belong to a same SSB group. In addition, the SSB may alternatively be indicated by SSB time domain position information. Spatial indexes in the spatial index set are in one-to-one correspondence to SSB time domain position information, and the receive end considers that the SSB time domain position information corresponding to the same spatial index belongs to the same SSB group.

2. Determining that reference objects having the same modulo result with respect to the spatial grouping factor belong to a same reference object group. Using an SSB as an example, the spatial grouping factor of the SSB is a value, such as M. The SSB is indicated by an SSB index, and the spatial index is SSB index mod M. The receive end considers that SSB indexes corresponding to the same spatial index belong to a same SSB group, that is, the receive end considers that SSBs with the same modulo result with respect to the spatial grouping factor M belong to a same SSB group. In addition, the SSB may alternatively be indicated by SSB time domain position information, the spatial index is SSB time domain position information (for example, an SSB time domain position index) mod M, and the receive end considers that SSB indexes corresponding to the same spatial index belong to a same SSB group, that is, the receive end considers that the SSB time domain transmission position information with the same modulo results with respect to the spatial grouping factor M belongs to one SSB group. It should be noted that in this determining method, the quantity of reference object groups is M.

The parameter information of the reference object group, the spatial information of the reference object, and indication information of the reference object (reference object index information and reference object time domain position information, or the like) can be carried in, without limitation to the following ways:

- explicitly carried through a physical broadcast channel, a control channel, a system broadcast information block, or other radio resource control (RRC) signaling;
- predefined, pre-configured by a manufacturer, or the like;
- implicitly carried: for example, used for at least one of reference signal (RS) sequence generation and signaling scrambling. The spatial information of the reference object and the indication information of the reference object are determined by detecting an RS sequence or performing descrambling. For example, the spatial information of the reference object and the indication information of the reference object can be implicitly carried by a demodulation reference signal DMRS; and the spatial information of the reference object and the indication information of the reference object are used to generate a scrambling code sequence of a PBCH, or the like.

It should be noted that the foregoing carrying method are optional methods. The different information mentioned in this embodiment of this disclosure (for example, the spatial information of the reference object group, the index information of the reference object group, the spatial information of the reference object, the indication information of the reference object, and the like) can be carried in different ways, which is not specifically limited in this embodiment.

This embodiment of this disclosure further describes the information transmission mode based on the reference object group in combination with different application scenarios.

Scenario 1

Further, the step 32 includes: determining an available random access resource based on a first correspondence between the reference object group and random access resources; and performing a random access procedure based on the available random access resource.

The random access procedure in this embodiment of this disclosure can be used for, without limitation to, one of the following functions: contention-based random access, contention-free random access, a system information SI request, beam failure recovery (BFR), and a preamble of a specified group. The specified group includes at least one of a group A and a group B. This behavior means that after the terminal determines an available random access channel occasion (RO), the terminal may try to obtain a resource for the available RO, and transmit msg1 at the RO for which a resource has been successfully obtained. If a plurality of available ROs are determined, the terminal may try to obtain resources for these ROs, and transmit msg1 at one or more ROs for which resources have been successfully obtained. The terminal may transmit one or more msg1. Specifically, the terminal may transmit a plurality of msg1 at one RO, or may transmit one msg1 at a plurality of ROs, or may transmit different msg1 at different ROs.

In the random access procedure mentioned in this embodiment of this disclosure, a first-step message transmitted by the terminal in a 4-step random access procedure is a message 1 (msg1), which is a preamble. In a 2-step random access procedure, a first-step message transmitted by the terminal is a message A (msgA), which may include at least one of a preamble and data. Design of msg1 in various solutions related to msg1 in this embodiment of this disclosure is also applicable to msgA.

It should be noted that the preamble may be determined in the random access procedure, for example, the 4-step random access channel procedure (4 step-RACH) or the 2-step random access channel procedure (2 step-RACH); or the preamble may not be determined in the random access procedure, for example, the 2-step random access procedure in which only data is transmitted directly in msgA.

Information about the first correspondence includes at least one of the following:

- information about a quantity of random access resources corresponding to the reference object group, for example, a quantity of SSB groups corresponding to one RO, or a quantity of ROs corresponding to one SSB group; and
- information about preambles corresponding to the reference object group in the random access resources, where the information about preambles is used to indicate at least one of a preamble for contention-based random access, a preamble for contention-free random access, a preamble for a system information SI request, a preamble for beam failure recovery BFR, and a preamble for a specified group. For example, a preamble corresponding to each SSB group on each RO is in a form of sequence index or sequence number, and includes at least one of the following: a preamble corresponding to each SSB group for contention-based random access; a preamble corresponding to each SSB group for contention-free random access; a preamble corresponding to each SSB group for an SI request; a preamble corresponding to each SSB group for BFR; a preamble corresponding to each SSB group for the group A; a preamble corresponding to each SSB group for the group B; a power parameter of the random access resource; and a measurement threshold for the reference object group.

The power parameter of the random access resource, may include at least one of increase of a preamble power climb counter, change of the preamble, a reception target power of the preamble, and a preamble climb step size.

The measurement threshold for the reference object group, for example, may be an average measurement threshold for the SSB group.

Scenario 2

The step 31 includes: determining a target monitoring occasion based on information about a second correspondence between the reference object group and monitoring occasions; and monitoring downlink information within the target monitoring occasion. The information about the second correspondence includes information about a quantity of monitoring occasions corresponding to the reference object group, and is used to indicate the quantity of monitoring occasions corresponding to the reference object group. Specifically, the information about the second correspondence is used to indicate a quantity of reference object groups corresponding to a group of monitoring occasions, where a group of monitoring occasions includes at least one monitoring occasion, or the information about the second correspondence is used to indicate a quantity of monitoring occasions corresponding to one reference object group. The reference object groups and monitoring occasions may be in one-to-one, one-to-many, or many-to-one correspondence.

Specifically, a monitoring activity includes but is not limited to the following:

Behavior I. In a search space, monitor a monitoring occasion corresponding to a first reference object, where the first reference object is a reference object that is quasi co-located with a received random access response (RAR) (or referred to as a reference object for RAR reception), or the first reference object is a reference object corresponding to a random access resource used for initiating a random access procedure. In the search space, the receive end assumes that the monitoring occasion and the reference object used when the RAR is received are QCLed.

Using an SSB as an example, in the search space, DCI is monitored at the monitoring occasion corresponding to the SSB used when the RAR is monitored and received. Assuming that during the RACH procedure, the receive end (terminal) determines, based on an SSB1, that a next available RO is RO1, and determines, based on an SSB2, that the next available RO is RO2, where RO1 and RO2 are different RO resources. The receive end successfully obtains at least one of the RO1 and RO2 resources, and transmits a preamble on the obtained resource. The transmit end (network device) receives the preamble and feeds back the RAR. Assuming that the terminal successfully receives the RAR by using QCL information of the SSB1, or the terminal determines, based on a random access radio network temporary identity (Random Access Radio Network Temporary Identity, RA-RNTI) of the terminal, that an associated SSB of the RO resource corresponding to the RAR is the SSB1, the terminal receives dedicated DCI of the terminal from a search space, such as a common search space (Common Search Space, CSS), in a control resource set such as a control resource set 0 (CORESET #0). For example, when the DCI is scrambled by a radio network temporary identity (Radio Network Temporary Identity, C-RNTI), the terminal monitors the DCI at the monitoring occasion corresponding to the SSB1 in the CSS. Optionally, the terminal assumes that the monitoring occasion corresponding to the SSB1 and the SSB1 in the CSS are QCLed. It should be noted that the foregoing uses CORESET #0 as an example. For other CORESETs, such as commonControlResourceSet and controlResourceSetZero, this scheme is also applicable.

Behavior II. In a search space, monitor a monitoring occasion corresponding to the reference object group. In the search space, the terminal assumes that the monitoring occasion and the reference objects in the reference object group are QCLed.

In the search space, DCI is monitored at the monitoring occasion corresponding to the reference object group. Specifically, in the search space, the DCI is monitored on all or some (that is, at least one) monitoring occasions corresponding to the reference object group. Using an SSB as an example, for example, in the search space, at least one of the monitoring occasions corresponding to the SSB group is monitored, and the terminal selects a monitoring occasion for monitoring by itself. Alternatively, in the search space, at least one SSB in the SSB group is selected, and a monitoring occasion corresponding to the selected at least one SSB is monitored, where the terminal may select, based on a measurement result, the SSB whose measurement result meets a specified threshold requirement. Assuming that during the RACH procedure, the terminal determines, based on an SSB1, that a next available RO is RO1, and determines, based on an SSB2, that the next available RO is RO2, where RO1 and RO2 are different RO resources. The terminal successfully obtains at least one of the RO1 and RO2 resources, and transmits a preamble on the obtained resource. The network device receives the preamble and feeds back the RAR. When the terminal receives dedicated DCI of a user, such as dedicated DCI scrambled by a C-RNTI, from a search space, for example, CSS, in a control resource set such as CORESET #0, the terminal monitors the DCI at the monitoring occasions corresponding to the SSB1 and the SSB2 in the CSS. Optionally, the terminal assumes that the monitoring occasions corresponding to the SSB1 and SSB2 and the SSB1 in the CSS are QCLed, and the monitoring occasions corresponding to the SSB1 and SSB2 and the SSB2 are also QCLed. It should be noted that the foregoing uses CORESET #0 as an example. For other CORESETs, such as commonControlResourceSet and controlResourceSetZero, this scheme is also applicable.

The information about the first correspondence and the information about the second correspondence mentioned in this embodiment of this disclosure may be predefined, indicated by the network device, or pre-configured by a manufacturer, and different correspondence information may be obtained in different ways, which is not limited in this embodiment of this disclosure.

Scenario 3

The step 31 further includes: performing rate matching or puncturing on target transmission information based on the reference object group, and transmitting the rate-matched or punctured target transmission information.

The target transmission information is different from the reference objects contained in the reference object group. Specifically, the step of performing rate matching or puncturing on target transmission information based on the reference object group includes: when a resource for at least one reference object in the reference object group and a resource for the target transmission information at least partially overlap, performing rate matching or puncturing on the target transmission information in one of the following preset modes.

The resource overlapping herein includes: time domain resource overlapping, frequency domain resource overlapping, and time-frequency domain resource overlapping, and particularly refers to the time-frequency domain resource overlapping in this embodiment. The case in which a resource for at least one reference object in the reference object group and a resource for the target transmission information at least partially overlap includes but is not limited to: resources for all reference objects in the reference object group and the resource for the target transmission information fully or partially overlap; and resources for some reference objects in the reference object group and the resource for the target transmission information overlap.

The preset modes include: transmitting a reference object in the reference object group on an overlapping resource; or transmitting the target transmission information on the overlapping resource.

Specifically, the implementation for transmitting a reference object in the reference object group on an overlapping resource includes but is not limited to:

1. The overlapping resource is used for transmitting the reference object, and the target transmission information is transmitted on a resource other than a time domain symbol on which the overlapping resource is located.

2. The overlapping resource is used for transmitting the reference object, and the target transmission information is transmitted on a resource other than the overlapping resource.

Moreover, a way of transmitting target transmission information on an overlapping resource includes but is not limited to:

1. The overlapping resource is used for transmitting the target transmission information, and a reference object corresponding to the overlapping resource is transmitted on a resource other than the overlapping resource.

2. The overlapping resource is used for transmitting the target transmission information, and a reference object corresponding to the overlapping resource is transmitted on a resource other than a time domain symbol on which the overlapping resource is located.

3. The overlapping resource is used for transmitting the target transmission information, and a reference object corresponding to the overlapping resource is not transmitted.

4. The overlapping resource is used for transmitting the target transmission information, and a reference signal group to which the reference object corresponding to the overlapping resource belongs is not transmitted.

It should be noted that determining (determine) mentioned in this embodiment of this disclosure may also be referred to as selecting (select), and the two have the same meaning and are usually interchangeable. In this embodiment of this disclosure, reference objects satisfying a specified quasi co-location relationship have QCL transitivity. Using a discovery reference signal (DRS) as an example, signals contained in a DRS may be at least one of an SSB, a CSI-RS, a control signal, and data. The control signal may be used to schedule at least one of remaining minimum system information (RMSI), other system information (OSI), paging (paging), RAR, and a control signal of a message 4 (msg4). The data signal may be at least one of RMSI, OSI, paging, RAR, and msg4. If at least one of signals included in one DRS and at least one of signals included in another DRS are QCLed, other signals included in the two DRSs are also quasi co-located. If two DRSs each include an SSB and a CSI-RS, and the SSBs corresponding to the two DRSs are quasi co-located, the CSI-RSs corresponding to the two DRSs are also quasi co-located. Optionally, the CSI-RS of one of the two DRSs and the SSB of the other of the two DRSs are also quasi co-located, and vice versa. If two DRSs are quasi co-located, SSBs corresponding to the two DRSs are quasi co-located, and CSI-RSs corresponding to the two DRSs are also quasi co-located. Optionally, the CSI-RS of one of the two DRSs and the SSB of the other of the two DRSs are also quasi co-located.

In the information transmission method according to this embodiment of this disclosure, the communications device of the receive end may determine the available transmission resources based on the reference object group containing the at least two reference objects, increasing opportunities for selecting the available transmission resources, thereby improving information transmission efficiency.

The information transmission method in different scenarios is separately described in detail in the foregoing embodiment. An embodiment below further describes a communications device of the receive end corresponding to the method with reference to an accompanying drawing.

Figure 4:
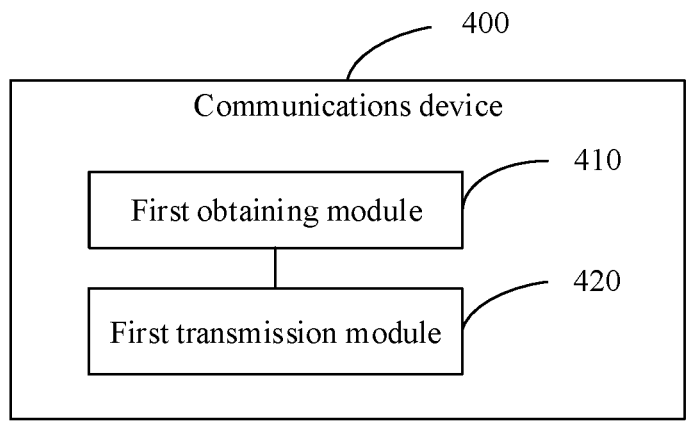
FIG. 4 is a schematic diagram of a modular structure of a communications device for a receive end according to an embodiment of this disclosure.

As shown in FIG. 4, a communications device 400 according to an embodiment of this disclosure can implement method details in the foregoing embodiments of obtaining a reference object group containing at least two reference objects in the foregoing embodiment, where the reference objects contained in the reference object group are quasi co-located; and performing information transmission based on the reference object group, with the same effect achieved. The communications device 400 specifically includes the following functional modules:

a first obtaining module 410, configured to obtain a reference object group containing at least two reference objects, where the reference objects contained in the reference object group are quasi co-located; and a first transmission module 420, configured to perform information transmission based on the reference object group.

The first obtaining module 410 includes:
a first obtaining submodule, configured to obtain parameter information of the reference object group, where the parameter information includes at least one of spatial information, pattern information, and index information of the reference object group; and
a first determining submodule, configured to determine the reference object group based on the parameter information.

The first obtaining module 410 further includes:
a second obtaining submodule, configured to obtain spatial information of the at least two reference objects, where the spatial information includes spatial index information and/or a spatial grouping factor, and the reference objects are indicated by reference index information and/or time domain position information; and
a second determining submodule, configured to determine the reference object group based on the spatial information.

The second determining submodule includes:
a first determining unit, configured to determine that reference objects having the same spatial index information belong to a same reference object group;
or
a second determining unit, configured to determine that reference objects having the same modulo result with respect to the spatial grouping factor belong to a same reference object group.

The first transmission module 420 includes:
a third determining submodule, configured to determine an available random access resource based on a first correspondence between the reference object group and random access resources; and
a first transmission submodule, configured to perform a random access procedure on the available random access resource.

Information about the first correspondence includes at least one of the following:
information about a quantity of random access resources corresponding to the reference object group;
information about preambles corresponding to the reference object group in the random access resources, where the information about preambles is used to indicate at least one of a preamble for contention-based random access, a preamble for contention-free random access, a preamble for a system information SI request, a preamble for beam failure recovery BFR, and a preamble for a specified group;
power parameters of the random access resources; and
a measurement threshold for the reference object group.

The first transmission module 420 further includes:
a fourth determining submodule, configured to determine a target monitoring occasion based on information about a second correspondence between the reference object group and monitoring occasions; and a monitoring submodule, configured to monitor downlink information within the target monitoring occasion.

Information about the second correspondence includes:

information about a quantity of monitoring occasions corresponding to the reference object group.

The first transmission module 420 further includes:

a matching submodule, configured to perform rate matching or puncturing on target transmission information based on the reference object group, where the target transmission information is different from the reference objects contained in the reference object group; and a transmission submodule, configured to transmit the rate-matched or punctured target transmission information.

The matching submodule include:

a matching unit, configured to, when a resource for at least one reference object in the reference object group and a resource for the target transmission information at least partially overlap, perform rate matching or puncturing on the target transmission information based on one of the following preset modes, where the preset modes include: transmitting a reference object in the reference object group on an overlapping resource; or transmitting the target transmission information on the overlapping resource. The reference objects include synchronization signal blocks SSB and/or channel state information reference signals CSI-RS.

It should be noted that, the communications device of the receive end according to this embodiment of this disclosure may determine available transmission resources based on the reference object group containing the at least two reference objects, increasing opportunities for selecting the available transmission resources, thereby improving information transmission efficiency.

The information transmission method in this disclosure is described from a receive end side in the foregoing embodiment. An embodiment below further describes the information transmission method from a transmit end with reference to an accompanying drawing.

Figure 5:
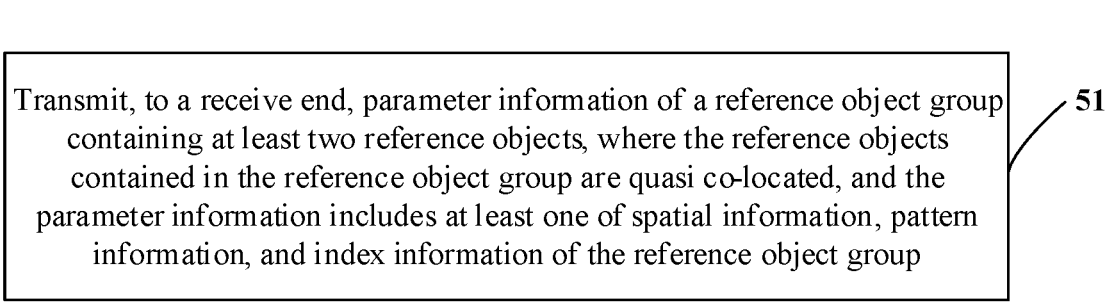
FIG. 5 is a schematic flowchart of an information transmission method for a transmit end according to an embodiment of this disclosure.

As shown in FIG. 5, an information transmission method in an embodiment of this disclosure is applied to a transmit end, and includes the following steps.

Step 51: Transmit, to a receive end, parameter information of a reference object group containing at least two reference objects, where the reference objects contained in the reference object group are quasi co-located, and the parameter information includes at least one of spatial information, pattern information, and index information of the reference object group The reference object group includes a plurality of reference objects, and the plurality of reference objects satisfy a specified quasi co-location relationship. The reference objects contained in the reference object group may include, but are not limited to: SSBs and/or channel state information reference signals CSI-RSs. Signal types of reference objects contained in one reference object group may be the same or different. For example, the reference object group includes quasi co-located SSBs, or the reference object group includes quasi co-located CSI-RSs, or the reference object group includes quasi co-located SSBs and CSI-RSs. In addition, quantities of reference objects contained in different reference object groups may be the same or different. When a quasi co-location relationship between different reference object groups is not indicated, the receive end does not assume that the plurality of reference objects belonging to the different reference object groups are quasi co-located.

The reference object group may be indicated by the spatial information (or referred to as direction information, QCL information, QCL type information, QCL spatial information, or the like). The spatial information may be pre-defined (for example, protocol-defined), indicated by a network device, or pre-configured by a manufacturer. In addition, the reference object group may alternatively be indicated by the pattern (pattern) information and/or the index (index) information, where the pattern information and the index information may also be predefined (for example, protocol-defined), indicated by a network device, or pre-configured by a manufacturer, and indication modes of the pattern information and the index information may be the same or different. In some embodiments, the index information of the reference object group may be implicitly carried by some signals, such as a PBCH, a DMRS, an SIB, DCI, or other system information, or explicitly carried by these signals. Optionally, the network device may alternatively transmit spatial information of each reference object group. For example, the transmit end transmits a direction information list for each reference object group, {direction 2, direction 3}. Each direction identifier in the direction information list represents a different direction, and the direction identifiers in the direction information list are in one-to-one correspondence to the reference object groups. Therefore, a terminal may determine a transmission direction of each reference object group based on the spatial information.

It should be noted that the step 51 corresponds to the first implementation of determining the reference object group in the receive end embodiment, and therefore is not repeated herein.

Further, in addition to using the step 51 to indicate the reference object group, before step 51, the transmit end may transmit, to the receive end, spatial information of the at least two reference objects, where the spatial information includes spatial index information and/or a spatial grouping factor, and the reference objects are indicated by reference index information and/or time domain position information. It should be noted that the time domain position information of the reference objects in this embodiment of this disclosure may be candidate time domain positions of the reference objects, or time domain positions of reference objects that are actually used and transmitted. In this way, the receive end may determine the reference object group based on the spatial information of the reference objects. Specifically, the receive end may determine that reference objects having the same spatial index information belong to a same reference object group. Alternatively, the receive end may determine that reference objects having the same modulo result with respect to the spatial grouping factor belong to a same reference object group. This implementation is an implementation of which the transmit end implicitly indicates the reference object group, corresponds to the second implementation of determining the reference object group in the receive end embodiment, and therefore is not repeated herein.

Further, before or after step 51, the information transmission method further includes at least one of the following:

transmitting a first correspondence between the reference object group and random access resources to the receive end; and transmitting a second correspondence between the reference object group and monitoring occasions to the receive end.

Information about the first correspondence includes at least one of the following:

information about a quantity of random access resources corresponding to the reference object group;

information about preambles corresponding to the reference object group in the random access resources, where the information about preambles is used to indicate at least one of a preamble for contention-based random access, a preamble for contention-free random access, a preamble for a system information SI request, a preamble for beam failure recovery BFR, and a preamble for a specified group;

power parameters of the random access resources; and a measurement threshold for the reference object group.

The information about the second correspondence includes: information about a quantity of monitoring occasions corresponding to the reference object group.

For a specific implementation of the information about the first correspondence and the information about the second correspondence, reference may be made to the receive end embodiment. Details are not repeated herein. In addition, this transmit end embodiment in the embodiments of this disclosure corresponds to the receive end embodiment. Those skilled in the art should understand that the foregoing receive end embodiment may be transformed into the transmit end embodiment through an interactive correspondence. Therefore, details are not described herein again.

In the information transmission method according to this embodiment of this disclosure, the communications device of the transmit end transmits, to the receive end, the reference object group containing the at least two reference objects that satisfy the quasi co-location relationship, so that the receive end can determine the available transmission resources based on the reference object group containing the at least two reference objects, increasing opportunities for selecting the available transmission resources, thereby improving information transmission efficiency.

The information transmission method in different scenarios is described in the foregoing embodiment. An embodiment below further describes a communications device of the transmit end corresponding to the method with reference to an accompanying drawing.

Figure 6:
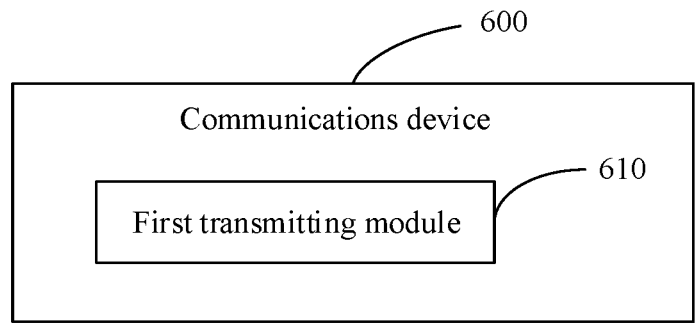
FIG. 6 is a schematic diagram of a modular structure of a communications device for a transmit end according to an embodiment of this disclosure.

As shown in FIG. 6, a communications device 600 according to an embodiment of this disclosure can implement method details in the foregoing embodiments of transmitting, to a receive end, parameter information of a reference object group containing at least two reference objects, where the reference objects contained in the reference object group are quasi co-located, and the parameter information includes at least one of spatial information, pattern information, and index information of the reference object group, with the same effect achieved. The communications device 600 specifically includes the following functional modules:

a first transmitting module 610, configured to transmit, to a receive end, parameter information of a reference object group containing at least two reference objects, where the reference objects contained in the reference object group are quasi co-located, and the parameter information includes at least one of spatial information, pattern information, and index information of the reference object group.

The communications device 600 further includes:

a second transmitting module, configured to transmit, to the receive end, spatial information of the at least two reference objects, where the spatial information includes spatial index information and/or a spatial grouping factor, and the reference objects are indicated by reference index information and/or time domain position information.

The communications module 600 further includes at least one of the following:

a third transmitting module, configured to transmit a first correspondence between the reference object group and random access resources to the receive end; and a fourth transmitting module, configured to transmit a second correspondence between the reference object group and monitoring occasions to the receive end.

Information about the first correspondence includes at least one of the following:

information about a quantity of random access resources corresponding to the reference object group;

information about preambles corresponding to the reference object group in the random access resources, where the information about preambles is used to indicate at least one of a preamble for contention-based random access, a preamble for contention-free random access, a preamble for a system information SI request, a preamble for beam failure recovery BFR, and a preamble for a specified group;

power parameters of the random access resources; and a measurement threshold for the reference object group.

The information about the second correspondence includes: information about a quantity of monitoring occasions corresponding to the reference object group. The reference objects include synchronization signal blocks SSB and/or a channel state information reference signals CSI-RS.

It should be noted that the communications device of the transmit end according to this embodiment of this disclosure transmits, to the receive end, the reference object group containing the at least two reference objects that satisfy the quasi co-location relationship, so that the receive end can determine the available transmission resources based on the reference object group containing the at least two reference objects, increasing opportunities for selecting the available transmission resources, thereby improving information transmission efficiency.

It should be noted that, it should be understood that division of the modules of the communications devices of the receive end and the transmit end are merely logical function division. Some or all of the modules may be integrated in a physical entity or may be separated physically in an actual implementation. In addition, the modules may be all implemented in a form of software invoked by a processing component, or may be all implemented in a form of hardware; or some of the modules may be implemented in a form of software invoked by a processing component, and some of the modules may be implemented in a form of hardware. For example, a determining module may be a processing component that is separately disposed, or may be integrated in a chip of the apparatus for implementation. In addition, the determining module may be stored in the memory of the apparatus in a form of program code, and is invoked by a processing component of the apparatus to perform a function of the determining module. Implementation of other modules is similar to this. In addition, all or some of the modules may be integrated, or may be implemented independently. Herein, the processing component may be an integrated circuit, and has a signal processing capability. In an implementation process, the steps in the foregoing method or the foregoing modules may be implemented by using an integrated logic circuit of hardware of the processor component or by using instructions in a form of software.

For example, the modules above may be one or more integrated circuits configured to implement the foregoing method, for example, one or more application-specific integrated circuits (ASIC), or one or more microprocessors (DSP), or one or more field programmable gate arrays (FPGA). For another example, when one of the foregoing modules is implemented in a form of program code invoked by a processing component, the processing component may be a general-purpose processor, for example, a central processing unit (CPU) or another processor that may invoke program code. For another example, the modules may be integrated in a form of a system-on-a-chip (SOC) for implementation.

Figure 7:
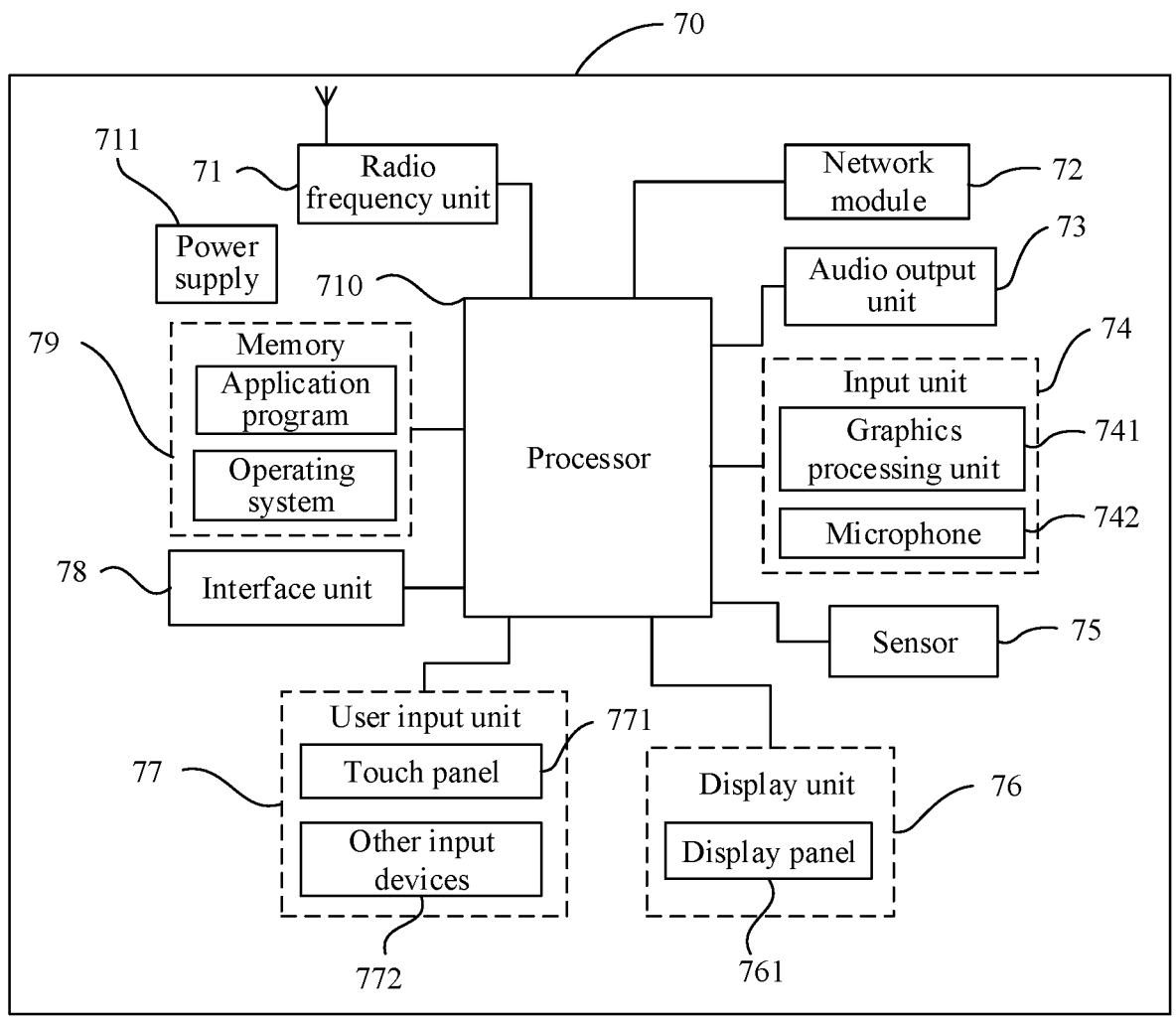
FIG. 7 is a block diagram of a terminal according to an embodiment of this disclosure.

To better achieve the foregoing objective, further, FIG. 7 is a schematic diagram of a hardware structure of a terminal for implementing each embodiment of this disclosure. The terminal 70 includes but is not limited to components such as a radio frequency unit 71, a network module 72, an audio output unit 73, an input unit 74, a sensor 75, a display unit 76, a user input unit 77, an interface unit 78, a memory 79, a processor 710, and a power supply 711. Persons skilled in the art may understand that the structure of the terminal shown in FIG. 7 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The terminal may be used for the receive end, or may be used for the transmit end.

When the terminal is used at the receive end, the radio frequency unit 71 is configured to obtain a reference object group containing at least two reference objects, where the reference objects contained in the reference object group are quasi co-located.

The processor 710 is configured to perform information transmission based on the reference object group.

When the terminal serves as the receive end, the terminal may determine available transmission resources based on the reference object group containing the at least two reference objects, increasing opportunities for selecting the available transmission resources, thereby improving information transmission efficiency.

When the terminal is used at the transmit end, the radio frequency unit 71 is configured to: transmit, to a receive end, parameter information of a reference object group containing at least two reference objects, where the reference objects contained in the reference object group are quasi co-located, and the parameter information includes at least one of spatial information, pattern information, and index information of the reference object group.

When the terminal serves as the transmit end, the terminal may transmit, to the receive end, the reference object group containing the at least two reference objects that satisfy the quasi co-location relationship, so that the receive end can determine the available transmission resources based on the reference object group containing the at least two reference objects, increasing opportunities for selecting the available transmission resources, thereby improving information transmission efficiency.

It should be understood that, in this embodiment of this disclosure, the radio frequency unit 71 may be configured to transmit or receive a signal in an information transmitting/receiving or call process. Specifically, the radio frequency unit 71 receives downlink data from a base station and transmits the downlink data to the processor 710 for processing; and transmits uplink data to the base station. Usually, the radio frequency unit 71 includes but is not limited to an antenna, at least one amplifier, a transceiver, a coupler, a low noise amplifier, a duplexer, and the like. In addition, the radio frequency unit 71 may further communicate with a network and another device by using a wireless communications system.

The terminal provides wireless broadband internet access for a user by using the network module 72, for example, helps the user transmit and receive e-mails, browse web pages, and access streaming media.

The audio output unit 73 may convert audio data received by the radio frequency unit 71 or the network module 72 or stored in the memory 79 into an audio signal and output the audio signal as a sound. In addition, the audio output unit 73 may further provide audio output (for example, a call signal reception tone or a message reception tone) that is related to a specific function performed by the terminal 70. The audio output unit 73 includes a loudspeaker, a buzzer, a phone receiver, and the like.

The input unit 74 is configured to receive an audio signal or a video signal. The input unit 74 may include a graphics processing unit (GPU) 741 and a microphone 742, and the graphics processing unit 741 processes image data of a static picture or a video obtained by an image capture apparatus (for example, a camera) in an image capture mode or a video capture mode. A processed image frame may be displayed on the display unit 76. An image frame processed by the graphics processing unit 741 may be stored in the memory 79 (or another storage medium), or may be sent by the radio frequency unit 71 or the network module 72. The microphone 742 may receive a sound, and can process the sound into audio data. In a phone call mode, processed audio data may be converted, for output, into a format for transmission by the radio frequency unit 71 to a mobile communications base station.

The terminal 70 further includes at least one sensor 75, for example, an optical sensor, a motion sensor, and another sensor. Specifically, the optical sensor includes an ambient light sensor and a proximity sensor. The ambient light sensor may adjust brightness of a display panel 761 based on intensity of ambient light. When the terminal 70 moves near an ear, the proximity sensor may disable the display panel 761 and/or backlight. As a motion sensor, an accelerometer sensor may detect a value of an acceleration in various directions (there are usually three axes), may detect a value and a direction of gravity when the terminal is still, and may be configured to recognize a posture of the terminal (for example, landscape/portrait mode switching, a related game, or magnetometer posture calibration), provide a function related to vibration recognition (for example, a pedometer or a keystroke), or the like. The sensor 75 may further include a fingerprint sensor, a pressure sensor, an iris sensor, a molecular sensor, a gyroscope, a barometer, a hygrometer, a thermometer, or an infrared sensor. Details are not described herein.

The display unit 76 is configured to display information entered by the user or information provided for the user. The display unit 76 may include the display panel 761. The display panel 761 may be configured in a form of a liquid crystal display (LCD), an organic light-emitting diode (OLED), or the like.

The user input unit 77 may be configured to receive input digit or character information, and generate a key signal input related to a user setting and function control of the terminal. Specifically, the user input unit 77 includes a touch panel 771 and other input devices 772. The touch panel 771, also referred to as a touchscreen, may capture a touch operation performed by a user on or near the touch panel (for example, an operation performed by the user on the touch panel 771 or near the touch panel 771 by using any appropriate object or accessory such as a finger or a stylus). The touch panel 771 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 710, receives a command transmitted by the processor 710, and executes the command. In addition, the touch panel 771 may be implemented in a plurality of forms, for example, a resistive, capacitive, infrared, or surface acoustic wave touch panel. In addition to the touch panel 771, the user input unit 77 may further include the other input devices 772. Specifically, the other input devices 772 may include but are not limited to a physical keyboard, a function key (for example, a volume control key or a power on/off key), a track ball, a mouse, and a joystick. Details are not described herein.

Further, the touch panel 771 may cover the display panel 761. After detecting a touch operation on or near the touch panel 771, the touch panel 771 transmits the touch operation to the processor 710 to determine a type of a touch event. Then the processor 710 provides corresponding visual output on the display panel 761 based on the type of the touch event. In FIG. 7, the touch panel 771 and the display panel 761 serve as two independent components to implement input and output functions of the terminal. However, in some embodiments, the touch panel 771 and the display panel 761 may be integrated to implement the input and output functions of the terminal. This is not specifically limited herein.

The interface unit 78 is an interface for connecting an external apparatus to the terminal 70. For example, the external apparatus may include a wired or wireless headphone port, an external power supply (or battery charger) port, a wired or wireless data port, a memory card port, a port for connecting an apparatus with an identification module, an audio input/output (input/output, I/O) port, a video I/O port, a headset port, or the like. The interface unit 78 may be configured to receive input (for example, data information and electric power) from the external apparatus, and transmit the received input to one or more elements in the terminal 70; or may be configured to transmit data between the terminal 70 and the external apparatus.

The memory 79 may be configured to store software programs and various types of data. The memory 79 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 79 may include a high-speed random access memory, or may include a nonvolatile memory, for example, at least one magnetic disk storage device or a flash memory device, or another volatile solid-state storage device.

The processor 710 is a control center of the terminal, connects various parts of the entire terminal by using various interfaces and lines, and executes various functions and data processing of the terminal by running or executing a software program and/or a module stored in the memory 79 and invoking data stored in the memory 79, so as to perform overall monitoring on the terminal. The processor 710 may include one or more processing units. Optionally, the processor 710 may integrate an application processor and a modem processor. The application processor mainly processes an operating system, a user interface, an application program, and the like. The modem processor mainly processes wireless communication. It may be understood that the modem processor may alternatively not be integrated into the processor 710.

The terminal 70 may further include a power supply 711 (for example, a battery) that supplies power to each component. Optionally, the power supply 711 may be logically connected to the processor 710 by using a power management system, so as to implement functions such as charging management, discharging management, and power consumption management by using the power management system.

In addition, the terminal 70 includes some functional modules that are not shown. Details are not described herein.

Optionally, an embodiment of this disclosure further provides a terminal, including a processor 710, a memory 79, and a computer program stored in the memory 79 and capable of running on the processor 710. When the computer program is executed by the processor 710, the processes of the foregoing information transmission method embodiments are implemented, and a same technical effect can be achieved. To avoid repetition, details are not described herein again. The terminal may be a wireless terminal or a wired terminal. The wireless terminal may be a device providing a user with voice and/or other service data connectivity, a handheld device having a wireless connection function, or another processing device connected to a wireless modem. The wireless terminal may communicate with one or more core networks through a radio access network (RAN). The wireless terminal may be a mobile terminal such as a mobile phone (also referred to as a "cellular" phone) or a computer having a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit (Subscriber Unit), a subscriber station (Subscriber Station), a mobile station (Mobile Station), a mobile terminal (Mobile), a remote station (Remote Station), a remote terminal (Remote Terminal), an access terminal (Access Terminal), a user terminal (User Terminal), a user agent (User Agent), or a user device (User Device or User Equipment). This is not limited herein.

An embodiment of this disclosure further provides a computer-readable storage medium, where the computer-readable storage medium stores a computer program. When the computer program is executed by a processor, each processes of the foregoing information transmission method embodiment are is implemented, with the same technical effect achieved. To avoid repetition, details are not described herein again. For example, the computer-readable storage medium is a read-only memory (ROM), a random access memory (RAM), a magnetic disk, or an optical disc.

To better achieve the foregoing objective, an embodiment of this disclosure further provides a network device. The network device includes a processor, a memory, and a computer program stored in the memory and capable of running on the processor. When the processor executes the computer program, the steps of the foregoing information transmission methods are implemented. An embodiment of this disclosure further provides a computer-readable storage medium, where the computer-readable storage medium stores a computer program, and when a processor executes the computer program, the steps of the foregoing information transmission methods are implemented.

Figure 8:
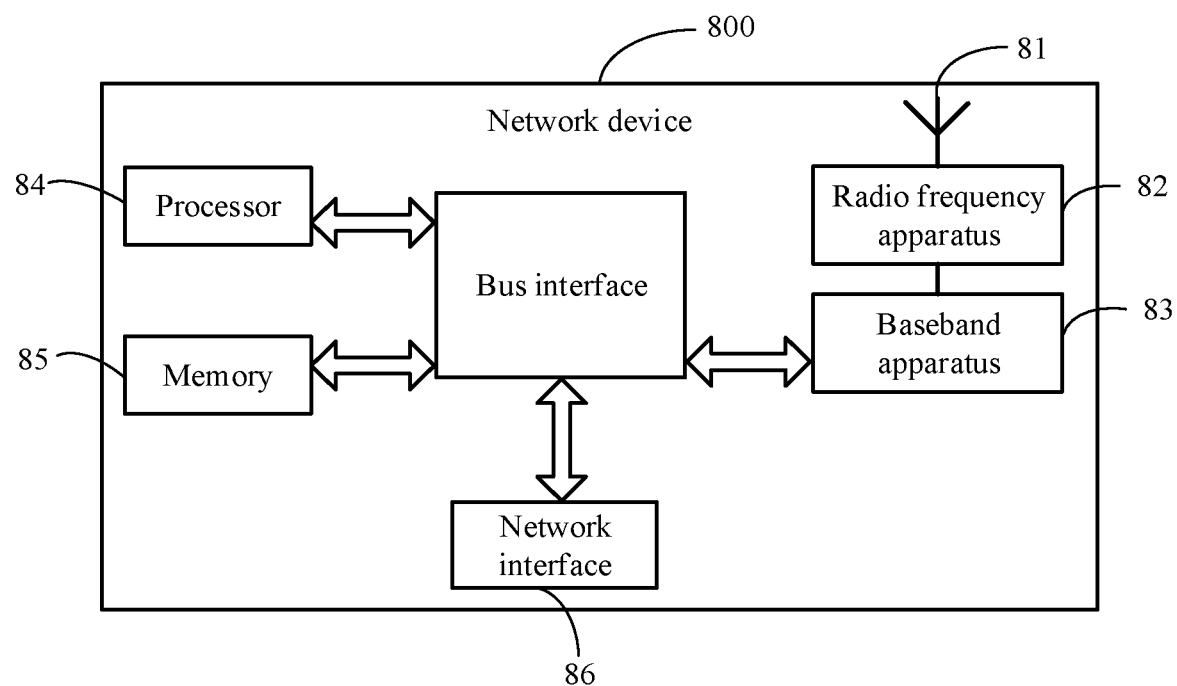
FIG. 8 is a block diagram of a network device according to an embodiment of this disclosure.

Specifically, an embodiment of this disclosure further provides a network device. As shown in FIG. 8, the network device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and transmits the received information to the baseband apparatus 83 for processing. In a downlink direction, the baseband apparatus 83 processes to-be-transmitted information, and transmits the information to the radio frequency apparatus 82; and the radio frequency apparatus 82 processes the received information and then transmits the information by using the antenna 81.

The frequency band processing apparatus may be located in the baseband apparatus 83. The method performed by the network device in the foregoing embodiment may be implemented by the baseband apparatus 83, and the baseband apparatus 83 includes a processor 84 and a memory 85.

The baseband apparatus 83 may include, for example, at least one baseband processing unit, where a plurality of chips are disposed on the baseband processing unit. As shown in FIG. 8, one of the chips is, for example, the processor 84, and connected to the memory 85, to invoke the program in the memory 85 to perform the operations of the network device shown in the foregoing method embodiment.

The baseband apparatus 83 may further include a network interface 86, configured to exchange information with the radio frequency apparatus 82, where the interface is, for example, a common public radio interface (CPRI).

The processor herein may be one processor, or may be a collective term for a plurality of processing components. For example, the processor may be a CPU, or may be an ASIC, or may be one or more integrated circuits configured to implement the method performed by the network device, for example, one or more microprocessors DSPs, or one or more field programmable gate arrays FPGAs. A storage component may be a memory, or may be a collective term for a plurality of storage components.

The memory 85 may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct rambus random access memory (DRRAM). The memory 85 described in this application is intended to include but is not limited to these and any other suitable types of memories.

Specifically, the network device in this embodiment of this disclosure further includes a computer program stored in the memory 85 and capable of running on the processor 84. The processor 84 invokes the computer program in the memory 85 to perform the method performed by each module shown in FIG. 6.

Specifically, the network device can only be used at a transmit end, and when the computer program of the network device is called by the processor 84, the computer program may be used to execute: transmitting, to a receive end, parameter information of a reference object group containing at least two reference objects, where the reference objects contained in the reference object group are quasi co-located, and the parameter information includes at least one of spatial information, pattern information, and index information of the reference object group.

The network device according to this embodiment of this disclosure transmits, to the receive end, the reference object group containing the at least two reference objects that satisfy the quasi co-location relationship, so that the receive end can determine the available transmission resources based on the reference object group containing the at least two reference objects, increasing opportunities for selecting the available transmission resources, thereby improving information transmission efficiency.

Persons of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to related technologies, or some of the technical solutions may be embodied in a form of a software product. The computer software product is stored in a storage medium, and includes instructions for enabling a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

Persons of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The storage medium may be a magnetic disk, an optical disc, a read-only memory (ROM), a random access memory (RAM for short), or the like.

It can be understood that the embodiments described in the embodiments of this disclosure may be implemented by hardware, software, firmware, middleware, microcode, or a combination thereof. For hardware implementation, the processing unit may be implemented in one or more application-specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented inside the processor or outside the processor.

In addition, it should be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence, and some steps may be performed in parallel or independently. A person of ordinary skill in the art can understand that all or any steps or components of the method and apparatus in this disclosure may be implemented by hardware, firmware, software, or a combination thereof in any computing apparatus (including a processor, a storage medium, and the like) or a network of computing apparatuses. This can be implemented as long as a person of ordinary skill in the art applies basic programming skill after reading the specification of this disclosure.

Therefore, an objective of this disclosure may also be achieved by running a program or a group of programs on any computing apparatus. The computing apparatus may be a well-known general apparatus. Therefore, the objective of this disclosure may also be achieved by merely providing a program product including program code for implementing the method or apparatus. To be specific, the program product also constitutes this disclosure, and a storage medium storing the program product also constitutes this disclosure. Apparently, the storage medium may be any well-known storage medium or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence. Some steps may be performed in parallel or independently.

The foregoing descriptions are merely optional implementations of this disclosure. It should be noted that a person of ordinary skill in the art may make several improvements or polishing without departing from the principle of this disclosure and the improvements and polishing shall fall within the protection scope of this disclosure.

What is claimed is:

1. An information transmission method, performed by a receive end being a terminal, comprising:
   receiving spatial information of at least two reference objects from a network device, wherein the spatial information comprises spatial grouping factor;
   determining that the reference objects having the same modulo result with respect to the spatial grouping factor are quasi co-located; and
   performing information transmission based on the reference objects which are quasi co-located.

2. The information transmission method according to claim 1, wherein the spatial information further comprises spatial index information, and the reference objects are indicated by reference index information and/or time domain position information.

3. The information transmission method according to claim 1, wherein the reference objects comprise an SSB, the SSB is indicated by an SSB index, SSB indexes corresponding to a same spatial index are quasi co-located, wherein the spatial index=SSB index mod M, M is a value range of the spatial grouping factor, and a range of M is $\{1, 2, 4, 8\}$.

4. The information transmission method according to claim 1, wherein the step of performing information transmission based on the reference objects which are quasi co-located comprises:
   determining an available random access resource based on a first correspondence between the reference objects and random access resources; and performing a random access procedure on the available random access resource;
   or
   the step of performing information transmission based on the reference objects which are quasi co-located further comprises:
   determining a target monitoring occasion based on information about a second correspondence between the reference objects and monitoring occasions; and monitoring downlink information within the target monitoring occasion;
   or
   the step of performing information transmission based on the reference objects which are quasi co-located further comprises:

performing rate matching or puncturing on target transmission information based on the reference objects and transmitting the rate-matched or punctured target transmission information, wherein the target transmission information is different from the reference objects contained in the reference objects.

5. The information transmission method according to claim 4, wherein the first correspondence comprises at least one of the following:
information about a quantity of random access resources corresponding to the reference objects;
information about preambles corresponding to the reference objects in the random access resources, wherein the information about preambles is used to indicate at least one of a preamble for contention-based random access, a preamble for contention-free random access, a preamble for a system information (SI) request, a preamble for beam failure recovery BFR, or a preamble for a specified group;
power parameters of the random access resources; or
a measurement threshold for the reference objects.

6. The information transmission method according to claim 4, wherein the second correspondence comprises:
information about a quantity of monitoring occasions corresponding to the reference objects.

7. The information transmission method according to claim 4, wherein the step of performing rate matching or puncturing on target transmission information based on the reference objects comprises:
when a resource for at least one reference object in the reference objects and a resource for the target transmission information at least partially overlap, performing rate matching or puncturing on the target transmission information based on one of the following preset modes:
wherein the preset modes comprise: transmitting a reference object in the reference objects on an overlapping resource; or transmitting the target transmission information on the overlapping resource.

8. The information transmission method according to claim 1, wherein the reference objects having the same modulo result with respect to the spatial grouping factor are quasi co-located comprises:
the reference objects having the same modulo result with respect to the spatial grouping factor are quasi co-located with respect to QCL-TypeA, and QCL-TypeD.

9. A communications device, performed by a receive end being a terminal, comprising a processor, a memory, and a computer program stored in the memory and running on the processor, wherein the processor executes the computer program to:
receive spatial information of at least two reference objects from a network device, wherein the spatial information comprises spatial grouping factor;
determine that the reference objects having the same modulo result with respect to the spatial grouping factor are quasi co-located; and
perform information transmission based on the reference objects which are quasi co-located.

10. The communications device according to claim 9, wherein
the spatial information further comprises spatial index information, and the reference objects are indicated by reference index information and/or time domain position information.

11. The communications device according to claim 9, wherein the reference objects comprise an SSB, the SSB is indicated by an SSB index, SSB indexes corresponding to a same spatial index are quasi co-located, wherein the spatial index=SSB index mod M, M is a value range of the spatial grouping factor, and a range of M is {1, 2, 4, 8}.

12. The communications device according to claim 9, wherein the processor executes the computer program to:
determine an available random access resource based on a first correspondence between the reference objects and random access resources; and
perform a random access procedure on the available random access resource;
or
determine a target monitoring occasion based on information about a second correspondence between the reference objects and monitoring occasions; and monitor downlink information within the target monitoring occasion;
or
perform rate matching or puncturing on target transmission information based on the reference objects and transmit the rate-matched or punctured target transmission information, wherein the target transmission information is different from the reference objects contained in the reference objects.

13. The communications device according to claim 12, wherein the first correspondence comprises at least one of the following:
information about a quantity of random access resources corresponding to the reference objects;
information about preambles corresponding to the reference objects in the random access resources, wherein the information about preambles is used to indicate at least one of a preamble for contention-based random access, a preamble for contention-free random access, a preamble for a system information (SI) request, a preamble for beam failure recovery (BFR), or a preamble for a specified group;
power parameters of the random access resources; or
a measurement threshold for the reference objects.

14. The communications device according to claim 12, wherein the second correspondence comprises:
information about a quantity of monitoring occasions corresponding to the reference objects.

15. The communications device according to claim 12, wherein the processor executes the computer program to:
when a resource for at least one reference object in the reference objects and a resource for the target transmission information at least partially overlap, perform rate matching or puncturing on the target transmission information based on one of the following preset modes:
wherein the preset modes comprise: transmitting a reference object in the reference objects on an overlapping resource; or transmitting the target transmission information on the overlapping resource.

16. The communications device according to claim 9, wherein the reference objects having the same modulo result with respect to the spatial grouping factor are quasi co-located comprises:
the reference objects having the same modulo result with respect to the spatial grouping factor are quasi co-located with respect to QCL-TypeA, and QCL-TypeD.

17. A communications device, performed by a transmit end being a network device, comprising: a processor, a memory, and a computer program stored in the memory and running on the processor, wherein the processor executes the computer program to:

transmit, to a terminal, spatial information of at least two reference objects, wherein the reference objects having the same modulo result with respect to the spatial grouping factor are quasi co-located.

18. The communications device according to claim 17, wherein
the spatial information further comprises spatial index information, and the reference objects are indicated by reference index information and/or time domain position information.

19. The communications device according to claim 18, wherein the reference objects comprise an SSB, the SSB is indicated by an SSB index, SSB indexes corresponding to a same spatial index are quasi co-located, wherein the spatial index=SSB index mod M, M is a value range of the spatial grouping factor, and a range of M is {1, 2, 4, 8}.

20. The communications device according to claim 17, wherein the processor executes the computer program to:
transmit a first correspondence between the reference objects and random access resources to terminal; or
transmit a second correspondence between the reference objects and monitoring occasions to the terminal;
wherein the first correspondence comprises at least one of the following:
information about a quantity of random access resources corresponding to the reference objects;
information about preambles corresponding to the reference objects in the random access resources, wherein the information about preambles is used to indicate at least one of a preamble for contention-based random access, a preamble for contention-free random access, a preamble for a system information (SI) request, a preamble for beam failure recovery (BFR), or a preamble for a specified group;
power parameters of the random access resources; or
a measurement threshold for the reference objects;
wherein the second correspondence comprises: information about a quantity of monitoring occasions corresponding to the reference objects.

* * * * *